United States Patent
Arnold et al.

(10) Patent No.: US 11,186,519 B2
(45) Date of Patent: Nov. 30, 2021

(54) METHHOD FOR PRODUCING A BIOCIDAL GLASS SURFACE OF A SODA-LIME GLASS

(71) Applicants: Glaswerke Arnold GmbH & Co. KG, Remshalden (DE); HEGLA boraident GmbH & Co. KG, Halle/Saale (DE)

(72) Inventors: Hans-Joachim Arnold, Remshalden (DE); Hermann Dehner, Neuendettelsau (DE); Thomas Rainer, Wernigerode (DE)

(73) Assignees: Glaswerke Arnold GmbH & Co. KG, Remshalden (DE); HEGLA boraident GmbH & Co. KG, Halle/Saale (DE)

(*) Notice: Subject to any disclaimer, the term of this patent is extended or adjusted under 35 U.S.C. 154(b) by 420 days.

(21) Appl. No.: 16/341,157

(22) PCT Filed: Nov. 27, 2017

(86) PCT No.: PCT/DE2017/101027
§ 371 (c)(1),
(2) Date: Apr. 11, 2019

(87) PCT Pub. No.: WO2018/113823
PCT Pub. Date: Jun. 28, 2018

(65) Prior Publication Data
US 2020/0181012 A1   Jun. 11, 2020

(30) Foreign Application Priority Data

Dec. 23, 2016 (DE) .................. 10 2016 125 544.0

(51) Int. Cl.
C03C 21/00 (2006.01)
A01N 59/16 (2006.01)
C03C 23/00 (2006.01)

(52) U.S. Cl.
CPC ............ C03C 21/008 (2013.01); A01N 59/16 (2013.01); C03C 23/0025 (2013.01)

(58) Field of Classification Search
CPC ................................................. C03C 21/008
See application file for complete search history.

(56) References Cited

U.S. PATENT DOCUMENTS

| | | | |
|---|---|---|---|
| 4,160,654 A | 7/1979 | Bartholomew et al. | |
| 5,127,931 A | 7/1992 | Kiefer et al. | |
| 5,871,879 A * | 2/1999 | Verlinden | C03C 17/02 430/155 |
| 6,921,546 B2 | 7/2005 | Albach | |
| 8,530,056 B2 | 9/2013 | Pilloy et al. | |
| 8,741,437 B2 | 6/2014 | Pilloy et al. | |
| 2004/0118157 A1 | 6/2004 | Borek et al. | |
| 2005/0239004 A1 | 10/2005 | Gahler et al. | |
| 2007/0172661 A1 | 7/2007 | Fechner et al. | |
| 2018/0071881 A1* | 3/2018 | Horie | C03C 19/00 |

FOREIGN PATENT DOCUMENTS

| | | |
|---|---|---|
| DE | 28 45 113 A1 | 5/1979 |
| DE | 38 40 071 A1 | 5/1990 |
| DE | 10 2004 011 316 A1 | 10/2004 |
| EP | 1 270 527 A1 | 1/2003 |
| EP | 1449 816 A1 | 8/2004 |
| EP | 2 165 987 A2 | 3/2010 |
| GA | 2 504 304 A1 | 5/2004 |
| JP | S56-5359 A | 1/1981 |
| JP | S56-17948 A | 2/1981 |
| JP | 2004-250327 A | 9/2004 |
| JP | 2007-507407 A | 3/2007 |
| JP | 2008-524097 A | 7/2008 |
| WO | 02/085807 A2 | 10/2002 |
| WO | 2005/030665 A1 | 4/2005 |
| WO | 2015/036426 A1 | 3/2015 |

OTHER PUBLICATIONS

Japanese Examination Report in JP 2019-549632, dispatched Jun. 9, 2020, with English translations.
Japanese Search Report in JP 2019-549632, dated May 15, 2020, with English translation.
DIN EN 572-1, Glass in building—Basic soda-lime silicate glass products—Part 1: Definitions and general physical and mechanical properties, Jun. 2016, 15 pages.
DIN EN 572-2, Glass in building—Basic soda-lime silicate glass products—Part 2: Float glass; Nov. 2012, 16 pages.
International Search Report in PCT/DE2017/101027, dated Feb. 21, 2018.
Canadian Examination Report in CA 3,041,593, dated Aug. 25, 2020.

* cited by examiner

*Primary Examiner* — Cynthia Szewczyk
(74) *Attorney, Agent, or Firm* — Collard & Roe, P.C.

(57) ABSTRACT

In a method for producing a biocidal glass surface of a soda-lime glass, a glass surface of a soda-lime glass is indirectly or directly contacted with silver, silver salt, or silver ions and directly or indirectly heated using at least one laser beam of a laser such that an ion exchange of sodium ions from the soda-lime glass with silver ions of the silver ions or from the silver or the silver salt results and silver ions of the silver ions deposit in the region of the glass surface. Before being heated, the glass surface is coated with a transfer support including a layer of silver and a protective layer covering the silver layer, such that the protective layer directly contacts the glass surface, the glass surface then being heated using the laser. Also, a soda-lime glass having a biocidal glass surface is produced by the method.

9 Claims, No Drawings

METHHOD FOR PRODUCING A BIOCIDAL GLASS SURFACE OF A SODA-LIME GLASS

CROSS REFERENCE TO RELATED APPLICATIONS

This application is the National Stage of PCT/DE2017/101027 filed on Nov. 27, 2017, which claims priority under 35 U.S.C. § 119 of German Application No. 10 2016 125 544.0 filed on Dec. 23, 2016, the disclosure of which is incorporated by reference. The international application under PCT article 21(2) was not published in English.

The production of biocidal surfaces, particularly of antibacterial surfaces, has been gaining increasing importance. A proven approach is killing off microorganisms, which adhere to surfaces, by strong chemical cleaning. This is not at all beneficial to persons and the environment. Moreover, in the case of treatment of germs with antibiotics, resistances can arise in the course of time. It would thus be of advantage to preclude adhesion and multiplication of bacteria at surfaces from the outset. In that case, coatings containing metal nanoparticles have proved to be of advantage, for example particles of copper (Cu), lead (Pb), mercury (Hg) or silver (Ag). A small percentage of these particles is present as ions and after penetration into the bacterium inactivates, inter alia, proteins so that this germ dies off. In that case, silver ions have proved particularly effective and still environmentally compatible. Silver ions can be used as a bactericide against, in particular, black *aspergillus* (*Aspergillus niger*), *Pseudomonas aeruginosa* and *Staphylococcus aureus*.

In general, by biocides there are understood chemicals or microorganisms used in the non-agrarian field for combating pests (for example, rats, insects, fungi, microbes). Biocides protect health and products of people. Biocidal products are subject in the European Union to Regulation (EU) No 528/2012. In Article 3, paragraph 1a) this defines biocidal products as any substance or any mixture in the form in which it reaches the user and which consists of one or more active ingredients or contains or generates these, which is intended for the purpose, in any way other than by pure physical and mechanical action, of destroying, deterring or rendering harmless noxious organisms, preventing the action thereof or combating them in any other way and any substance or any mixture which is produced from substances or mixtures—which do not themselves come under the first indent—and is intended for the purpose, in any way other than by pure physical and mechanical action, of destroying, deterring or rendering harmless noxious organisms, preventing the action thereof or combating them in any other way.

Bactericides are chemical substances which kill off bacteria. Bactericides belong to the category of microbiocides. The adjective 'bactericidal' describes the mortal action of a substance on bacteria.

Methods in which an ion exchange of alkali ions in the glass surface takes place have become generally for the purpose of chemical hardening and/or coloring of glass.

With respect thereto, reference can also be made to DE 38 40 071 A1 in which a number of known methods according to the prior art is described:

Replacement of smaller alkali ions by larger alkali ions, whereby a compressive stress by which the strength of the glass can be substantially improved arises in the glass surface.

Ion exchange of alkali ions by silver ions and/or by copper ions so as to produce coloration in the glass surface, for example for producing scales on glass instruments, wherein the scale is applied to the glass in the form of a paste containing AgCl.

Ion exchange by means of a molten salt (salt bath) at comparatively low temperatures of up to approximately 450° C., for example melting of alkali nitrates or alkali nitrites, or at higher temperatures, for example melting of chlorides and/or sulfates.

Salt melts can attack the surface not only of the glass to be treated, but also of the melt container and other devices. Working with molten salts is not without risk and due to the toxicity and the risk of explosion requires special safety precautions, which very much hinder large-scale use. Salt baths age due to absorbed ion exchange products built up in the salt bath, as a result of which the ion exchange is obstructed or weakened. Salt baths thus have to be regularly renewed. Moreover, disposal of exhausted salt baths requires a substantial outlay. Due to the ageing of the salt baths, the ion exchange conditions change over time so that the method parameters have to be constantly adapted in order to achieve a method product with unchanging properties.

In order to eliminate the principal disadvantages of salt melts, to guarantee constant conditions for the ion exchange, to prevent attack or damage of the glass surface to be treated or technical equipment depending on the exchange medium used for the ion exchange and for the purpose of an easy capability of removal of the ion exchange medium from the glass surface, a method for ion exchange at glass or glass-ceramic by means of a salt layer with exchangeable cations at elevated temperature has been proposed in accordance with DE 38 40 071 A1. In this method a non-melting and non-decomposing layer, which is solid at ion exchange temperature, of salt particles with a particle size of less than 250 microns is applied to the glass or glass-ceramic and the glass or glass-ceramic is subsequently brought to ion exchange temperature. The ion exchange takes place in a solid-state reaction. The ion exchange can be assisted by an electrical field. Salts of alkali metals, silver, zinc and cadmium are preferred for use. The salts are used particularly in the form of sulfates, chlorides, pyrosulfates, carbonates, nitrates, phosphates, nitrites and oxides. In order to apply the salt layer to the glass surface, use can be made of the following methods: application of finely powdered salt by means of electrostatic forces; spraying of a dispersion or suspension of the salt; dipping of the glass surface into the dispersion or suspension; or coating by means of screen-printing or a transfer process. The latter techniques, in particular, are suitable only for coating selected sub-regions of the glass surface. After application of the salt layer and optional drying, the glass or the glass-ceramic is brought in an oven to ion exchange temperature. Depending on the type of glass or glass-ceramic and depending on whether processing is to be carried out above or below the glass transformation temperature $T_g$ of the glass this temperature lies between 400° C. and approximately 1,000° C. After ion exchange has taken place, the applied layer is removed again, for example by simple brushing off or by dissolution in water.

In this method, similarly to the case of salt melts, the entire glass body or the entire glass-ceramic body is brought to ion exchange temperature. This takes place in the case of this method in an oven, whereas in the case of the dip method using salt melts a heated container is employed. As a result, undesired changes in the structure and/or of the physical characteristics of the treated glass or glass-ceramic body can occur. Limitation of the ion exchange to specific sub-areas of the glass or glass-ceramic body to be treated is not possible or is possible only with cost. These methods are comparatively inflexible and the field of use thereof is comparatively limited.

A method for production of hydrate glasses, which contain silver, with thermoplastic and photosensitive characteristics has become known from DE-A-28 45 113. According to that, silver ions ($Ag^+$) can be incorporated in a glass, which is suitable for hydration, after the hydration or simultaneously with this and impart photosensitive characteristics to the glass. This method is concerned with production of glass bodies with thermoplastic properties, which include $Ag^+$ ions at least in a surface part, and substantially contain in mol % on an oxide base 3 to 25% $Na_2O$ and/or $K_2O$ and 50 to 95% $SiO_2$, wherein the sum of these components is at least 55% of the total composition. According to a first alternative, the glass bodies with a thickness not above 5 millimetres are brought at a temperature above 100° C. and a pressure above 20 psig into contact with an aqueous solution, which contains $Ag^+$ ions, with a pH below 4 at least until a surface part is hydrated to an extent producing thermoplastic characteristics and $Na^+$ ions and/or $K^+$ ions are replaced by $Ag^+$ ions, wherein the proportion of $Na^+$ ions and/or $K^+$ ions of the hydrated glass decreases with increasing $Ag^+$ ions. According to a second alternative, the glass body is exposed at a temperature of at least 100° C. to a gas atmosphere, which contains $H_2O$, of at least 75% relative humidity for a period of time sufficient for development of at least a surface part substantially saturated with water, subsequently dehydrated by contact with a gas atmosphere with a humidity amounting to at least 90% of the relative humidity of the first gas atmosphere until the water content of at least a surface part has diminished, but is still sufficiently high for giving rise to thermoplastic characteristics, and finally the glass body is brought into contact at a temperature above 100° C. with an aqueous solution, which contains $Ag^+$ ions, with a Ph below 5 at least until $Na^+$ ions and/or $K^+$ ions are replaced by $Ag^+$ ions, wherein the proportion of $Na^+$ ions and/or $K^+$ ions of the hydrated glass decreases with increasing $Ag^+$ ions. The glasses, which are darkened by ultraviolet irradiation and are hydrated in silver salt solutions, with exchanged silver ions ($Ag^+$ ions) can be optically bleached by polarised or non-polarised laser beams of a laser. For example, thin glass strips are immersed in $AgNO_3$ solutions of different silver salt concentrations and heated for 8 hours in an autoclave at 270° C. These methods are costly and have disadvantages similar to those of the methods already described in the foregoing.

Moreover, it has become generally known to furnish a glass surface with silver ions having an antibacterial action in that silver nanoparticles are applied to the glass surface and fixed by a lacquer. The silver nanoparticles deliver silver ions which diffuse through the matrix at the glass surface. Here they can interact with microorganisms adhering thereto. A disadvantage of this method consists in the wear of the lacquer layer, so that after a certain time the germ-mortality effect diminishes.

A method for structuring a glass surface into hydrophilic regions and hydrophobic regions and a printing plate has become known from DE 10 2004 011 316 A1, which can be structured by a method of that kind. This specification discloses a method with features of the preamble of claim 1 without disclosing the production or construction of a biocidally effective glass surface of a soda-lime glass. In this method, the glass surface has to be precoated and an expensive subsequent cleaning is required. Moreover, in this method the consumption of silver is comparatively high.

It is an object of the invention to provide a method for producing a biocidal, particularly bactericidal, thus antibacterially-acting, glass surface of a soda-lime glass by which the disadvantages of the methods known from the prior art are avoided and with which expanded or entirely new applications are possible.

According to the invention this object is fulfilled by a method of producing a biocidally, particularly bactericidally, acting glass surface of a soda-lime glass, in which a glass surface of a soda-lime glass is brought directly or indirectly into contact with silver or silver salt or silver ions ($Ag^+$ ions) and directly or indirectly heated by means of at least one laser beam of at least one, preferably pulsed, laser, preferably locally, particularly punctiformly or linearly, preferably at points, in such a way that ion exchange of sodium ions ($Na^+$ ions) from the soda-lime glass with silver ions ($Ag^+$ ions) of the silver ions or with silver ions ($Ag^+$ ions) from the silver or from the silver salt and deposition of silver ions of the silver ions in the region of the glass surface take place, wherein the glass surface before being heated by means of the at least one laser beam of the laser is covered by a transfer carrier, which has a layer of silver and a protective layer covering the layer of silver, in such a manner that the protective layer directly contacts the glass surface, wherein subsequently thereto the glass surface is heated by means of at least one laser beam of the laser, particularly a solid-body laser or a fibre laser, preferably an Nd:YAG fibre laser. This is thus such that there is ion exchange of sodium ions ($Na^+$ ions) from the soda-lime glass with silver ions ($Ag^+$ ions) of the silver ions or with silver ions ($Ag^+$ ions) from the silver or from the silver salt and deposition of silver ions of the silver ions in the region of the glass surface.

This method is distinguished by a particularly notable economy in the production of biocidal glass surfaces. By comparison with the method of precoating glass with a silver salt solution and subsequent drying in accordance with the prior art, the method according to the invention has a number of further advantages:

lower material consumption of silver;
no precoating required; and
no expensive subsequent cleaning required.

According to a particularly advantageous variant of embodiment it can be provided that the transfer carrier has a carrier side (rear side) facing away from the protective layer, preferably in an opposite direction, and that the at least one laser beam radiates in the direction of as well as directly or indirectly onto the carrier side, which faces away from the protective layer, of the transfer carrier, as a result of which the glass surface is heated, or so that the glass surface is indirectly heated by means of the at least one laser beam.

In the method according to the invention the energy of the at least one laser beam of the laser is almost completely absorbed by the layer of silver or by a coating, which contains the layer of silver, of a transfer material of the transfer carrier. The silver or the coating of the carrier material of the transfer carrier is thereby dissolved and transferred under the action of energy (heat) to the glass surface of the soda-lime glass. In that case the glass surface is either substantially indirectly heated or exclusively indirectly heated by means of the laser beam of the laser.

In the method according to the invention neither the glass to be treated is damaged nor does the treated glass have discoloration caused by the process. Biocidal, particularly bactericidal, glass surfaces of soda-lime glasses are producible by the method according to the invention, which have numerous uses, for example in the field of health, particularly in hospitals and medical practices, in the field of foodstuffs, in the domestic field, particularly in kitchens, in the sanitary field, in the construction field, particularly for architectural glass, and in process-engineering equipment and apparatus. Particularly preferred applications relate to glass doors, glass for hospitals and image screen touch zones or contact zones ('touch panels') as well as contact-sensitive image screens ('touch screens'). Soda-lime glasses can be provided by the method according to the invention with biocidal surfaces not only over a small area, but also over a large area. By comparison with methods known from the prior art, the method according to the invention has, in particular, the following advantages: It is more cost-effective and energy-efficient, the material use of silver is lower, and structuring of the glass surface, even only part surfaces of the glass surface, of a glass is possible for the first time. Thus, for example, in the case of a glass door a biocidal effect and at the same time a surface structuring can be produced only in a glass surface region around a door handle of the glass door. Glass surfaces with a biocidal action and at the same time with glass surface structures, particularly with precision structures in the micrometre range or in micron dimensions, can be produced by means of the method according to the invention.

Basic glass products of soda-lime glass are defined and classified in DIN EN 572-1 (June 2016). This European standard also states the chemical composition and the most important physical and mechanical characteristics of these basic products and defines the general quality criteria thereof.

For preference, the laser can be a laser emitting in the infrared wavelength range.

According to an advantageous development the laser can be a $CO_2$ laser or an Nd:YAG laser.

According to an advantageous embodiment the silver salt can be silver nitrate or silver chloride and/or the anions can be nitrate ions or chlorine ions.

According to a preferred variant of embodiment the layer of silver can consist of atomic silver. The layer of silver can consist of silver nanoparticles (nano-silver). The support material of the transfer support can be coated, preferably sputtered, with silver, particularly with silver nanoparticles, for formation of the said layer.

The protective layer can preferably be a lacquer protective layer.

According to an embodiment it can be provided that the transfer carrier comprises a carrier layer preferably consisting of plastics material or formed by plastics material. The carrier layer can be a film and/or a strip.

According to an advantageous variant it can be provided that the layer of silver, on or to which the protective layer is arranged or applied, is arranged on or applied to a carrier layer of the transfer carrier or on or to the carrier layer of the transfer carrier. In a preferred embodiment it can be provided that an adhesion-promoting layer for promoting adhesion of the silver to the carrier layer is arranged or applied between the carrier layer and the layer of silver, preferably directly arranged on or applied to the carrier layer.

According to a preferred development it can be provided that the laser is a laser emitting in the infrared wavelength range. The laser can be a pulsed laser or a laser which is operable or operated in so-called pw operation (pulsed operation) or in PWM operation (pulse width modulation operation). In PWM operation the laser is switched on for a pulse duration $\tau$ of a few microseconds. Thereafter, a switch-off phase takes place, which results from the difference of the period duration T in microseconds and the pulse duration $\tau$.

According to a variant of embodiment the laser can be a gas laser, preferably a $CO_2$ laser emitting, in particular, at a principal wavelength of 10.6 microns, or a solid-body laser, preferably an Nd:YAG laser (neodym: yttrium-aluminium-granite laser), which, in particular, emits at a principal wavelength of 1064 nanometres. The use of an Nd:YAG laser offers, by comparison with use of a $CO_2$ laser, the advantage that the visible process fluctuations occur to a substantially smaller extent. In addition, fewer process steps are then required and, moreover, these can be run through more rapidly.

According to advantageous development it can be provided that the glass surface is so heated by means of the laser beam of the laser at individual, preferably punctiform, locations or points in succession in time that the individual locations or points overlap or do not overlap.

According to a variant of embodiment it can be provided that the ion exchange is assisted by an electrical field.

According to a preferred example of embodiment it can be provided that the silver salt is silver nitrate ($AgNO_3$) or silver chloride (AgCl) and/or that the anions are nitrate ions ($NO_3^-$) or chlorine ions ($Cl^-$).

According to a particularly preferred embodiment it can be provided that the soda-lime glass is float (flat) glass having a bath side and an air side.

'Float glass' is, according to the already mentioned DIN EN 572-1, number 3.1, a planar, transparent, clear or coloured soda-lime glass with parallel and polished surfaces, produced by continuous pouring and flow over a metal bath. Requirements with respect to size and minimum quality (with respect to optical and visible faults) for float glass in the field of construction are defined in DIN EN 572-2 cited in this European standard.

According a particularly preferred variant of embodiment it can be provided that the glass surface on the air side of the float (flat) glass is brought into contact with the silver or with the silver salt or with the silver ions. In this case the glass surface is not optically impaired by the laser treatment, i.e. the treated glass surface with biocidal action is not visible to the human eye. The float glass treated with use of the method according to the invention does not have any process-induced discoloration on its air side. If the process were to be carried out on the bath side (tin-rich side) of the float glass the glass would colour lightly brown. This coloration can be avoided on the air side of the float glass.

The heating or treatment of the glass surface by means of the laser beam of the laser can be carried out over an area or punctiformly and/or only at a location or at points, thus at different locations. The punctiform and/or point-specific heating or treatment is the most economic form of embodiment. According to a refinement of the method it can be provided that the heating or treatment is carried out by means of the laser beam of the laser only locally. It can be provided that the heating or treatment by means of the laser beam of the laser does not necessarily embrace the entire glass surface. It can be provided that only a part of the glass surface is heated or treated by means of the laser beam of the laser. According to an advantageous embodiment of the method it can be provided that the glass surface is heated by means of the at least one laser beam of the laser in such a way that an areal or punctiform and/or a point-specific biocidal structure is obtained or arises in the region of the glass surface.

According to a variant of embodiment it can be provided that transfer material remaining on the glass surface after the laser treatment is removed by wiping off from the glass surface (drying by wiping). Thus, a dry glass surface can be obtained by simple wiping.

According to a variant of embodiment it can be provided that use is made of a laser printing head by means of which a local glass surface or several local glass surfaces of the soda-lime glass, for example an area or a respective area of 100 mm×100 mm, is heated by means of the at least one laser beam of the laser or by means of several laser beams of one or several lasers. In order to process larger glass surfaces, several individual surfaces—whether overlapping or not overlapping—can be treated or heated in succession by means of the at least one laser beam of the laser or by means of several laser beams of one or more lasers.

According to a preferred variant of embodiment it can be provided that the transfer carrier having the layer of silver is pressed by its protective layer against the glass surface with the help of a pressing body, preferably consisting of glass, in particular constructed as a pressure plate.

The invention also relates to a soda-lime glass, particularly a float (flat) glass with a biocidally, particularly bactericidally, acting glass surface, which is produced by the method according to the invention. According to an advantageous embodiment it can be provided that the glass surface comprises a flat or punctiform and/or point-specific biocidal structure.

Further advantages, features and aspects of the invention are evident from the following description part, in which a preferred example of embodiment of the invention is described.

EXAMPLE OF EMBODIMENT

In this experiment a biocidal glass surface of a soda-lime glass was produced with the help of a transfer carrier, which is constructed as a silver transfer belt, and a fibre laser.

Float glass in the form of proprietary object supports (dimensions: 76×26×1 mm) serves as the category of glass. The float glass or the object support has a bath side and an air side. This glass side is unsuitable for the ion exchange, which is desired here, due to diffusion thereinto of tin on the (tin) bath side of the glass of the object support in the production process. The tin would act as reduction agent and have the effect that the silver ions to be driven in reduce again to atomic silver or to silver nanoparticles. This would colour the glass. Accordingly, the air side initially identified under ultraviolet light and was then defined for all experiments as the process side.

The silver transfer belt comprised, as carrier layer, a plastics material belt. The plastics material belt was coated on one side with an adhesion-promoting layer which was coated with only wafer-thin layers of sputtered silver. The silver was then present there atomically. The silver layer was coated with a protective layer formed as a lacquer layer. The silver layer and the protective layer formed a coating of the carrier layer.

The silver transfer belt thus has several layers and, in particular, the carrier layer formed from the plastics material belt, the silver layer, the adhesion-promoting layer, which is formed between the carrier layer and the silver layer, for promoting adhesion of the silver to the plastics material belt, and the lacquer layer, which is directly arranged on or applied to the silver layer and which covers the silver layer, for protection of the silver layer.

The glass object support was covered on the air side, which currently forms the upper side, by the silver transfer belt in such a way that the protective layer, which currently forms the front side of the transfer carrier, directly contacted the glass surface.

In order to achieve particularly good support of the silver transfer belt by way of its protective layer on the glass object support, the silver transfer belt was pressed by its protective layer, which faces the glass object support, with the help of a further glass plate against the glass surface on the air side of the glass object support consisting of float glass. This further glass plate can also be termed pressing glass plate.

As supplier of energy for the subsequent ion exchange use was made of an Nd:YAG fibre laser. This laser emits at a principal wavelength of $\lambda=1064$ nm. At this wavelength the laser beam of this laser is absorbed in glass only comparatively poorly.

Starting from the transfer carrier (silver transfer belt) directly bearing by its protective layer (front side) against the glass surface, the pressing glass plate pressed onto the transfer carrier was irradiated by laser beams, which are emitted by the laser, on that glass side facing in opposite direction away from the transfer carrier. As a result, the transfer carrier lying under the pressing glass plate was also irradiated with the laser beams emitted by the laser.

It was thus possible for the laser beams of this laser to be able to penetrate through the upper pressing glass plate and into the transfer carrier (silver transfer belt) disposed thereunder.

Contrary to expectations, it has unexpectedly proved that in the case of laser beams with a principal wavelength of 1064 nanometres there was almost no complete reflection of the laser beams at the silver or at the silver layer of the transfer carrier (silver transfer belt), but on the contrary it was even possible to couple sufficient energy into silver or the silver layer of the coating so that—sufficing for achieving a biocidal action—there was ion exchange of sodium ions from the soda-lime glass with silver ions from the silver or from the silver layer of the transfer carrier and deposition of silver ions of the silver ions in the region of the glass surface of the soda-lime glass.

Since the silver is fixed in the silver transfer belt by means of the lacquer or by means of the lacquer layer there was no contamination of the float glass surface with silver in the case of contact of the transfer carrier with the float glass surface of the glass object support. Only after the laser process did the transfer belt lightly adhere to the glass object support only at the processed locations, thus at the locations irradiated by means of the at least one laser beam of the at least one laser. As a result, the glass surface thereof was coated very homogenously and only in the desired region. In addition, the use of the fibre laser led to a further increase in the homogeneity of the silver coating. Due to the use of the fibre laser, a greater degree of homogeneity of the coating could be achieved by comparison with the use of a $CO_2$ laser.

The invention claimed is:

1. A method of producing a biocidally acting glass surface of a soda-lime glass, comprising:
   bringing a glass surface of a soda-lime glass directly or indirectly into contact with silver or silver salt or silver ions;
   covering the glass surface by a transfer carrier comprising a carrier layer, a layer of silver arranged on or applied to the carrier layer, and a protective layer of lacquer arranged on or applied to the layer of silver to cover the layer of silver so that the protective layer of lacquer directly contacts without adhering to the glass surface; and subsequently directly or indirectly heating the glass surface using at least one laser beam of a laser in such a way that ion exchange of sodium ions from the soda-lime glass with silver ions of the silver ions or with silver ions from the silver or from the silver salt and deposition of silver ions of the silver ions in the region of the glass surface take place.

2. The method according to claim 1, wherein the soda-lime glass is float glass having a bath side and an air side, wherein the glass surface on the air side of the float glass is brought into contact with the silver or with the silver salt or with the silver ions.

3. The method according to claim 1, wherein the carrier layer is formed by plastics material or comprises plastics material.

4. The method according to claim 1, wherein the carrier layer is a film or a strip.

5. The method according to claim 1, wherein the glass surface is heated by means of the at least one laser beam of the laser in such a way that an areal or punctiform and/or a point-specific biocidal structure is obtained in the region of the glass surface.

6. The method according to claim 1, wherein the glass surface is so heated by means of the at least one laser beam of the laser at individual locations in succession in time that the individual locations overlap or do not overlap.

7. The method according to claim 1, wherein by means of a pressure body the transfer carrier having the layer of silver is pressed by its protective layer, which covers the layer of silver, against the glass surface.

8. The method according to claim 1, wherein the transfer carrier has a carrier side facing away from the protective layer and wherein the at least one laser beam radiates in the direction of and directly or indirectly onto the carrier side, which faces away from the protective layer, of the transfer carrier, whereby the glass surface is heated.

9. The method according to claim 1, wherein the glass surface is so heated by means of the at least one laser beam of the laser at individual punctiform locations in succession in time that the individual locations overlap or do not overlap.

* * * * *